United States Patent [19]

Fukuta et al.

[11] Patent Number: 4,543,641

[45] Date of Patent: Sep. 24, 1985

[54] MULTIPLICATION DEVICE USING MULTIPLE-INPUT ADDER

[75] Inventors: Masaharu Fukuta; Yoshio Oshima; Sako Ishikawa; Toru Ohtsuki, all of Hadano, Japan

[73] Assignee: Hitachi, Ltd., Tokyo, Japan

[21] Appl. No.: 461,257

[22] Filed: Jan. 26, 1983

[30] Foreign Application Priority Data

Jan. 29, 1982 [JP] Japan ............................. 57-11626

[51] Int. Cl.[4] ............................................. G06F 7/52
[52] U.S. Cl. .................................................. 364/756
[58] Field of Search ................ 364/756, 755, 754, 760

[56] References Cited

U.S. PATENT DOCUMENTS 3,644,724   2/1972   Snejanka et al. .................... 364/756

OTHER PUBLICATIONS

Larson, "Medium Speed Multiply", *IBM Tech. Disclosure Bulletin*, vol. 16, No. 7, Dec. 1973, pp. 2055.
Larson, "High-Speed Multiply Using Four Input Carry-Save Adder", *IBM Tech. Disclosure Bulletin*, vol. 16, No. 7, Dec. 1979, pp. 2053-2054.
Jackson et al., "Binary Multiplication & Division Utilizing a Three-Input Adder", *IBM Tech. Disclosure Bulletin*, vol. 15, No. 7, Dec. 1972, pp. 2263-2268.

*Primary Examiner*—David H. Malzahn
*Attorney, Agent, or Firm*—Antonelli, Terry & Wands

[57] ABSTRACT

A multiplier device comprising hold means for holding the result of addition, block product means for producing k block products each having 2n bits, where n is an integer equal to or greater than 2, the k block products being formed by multiplying each block by n bits, k blocks being obtained by dividing a multiplicand at intervals of n bits from the least significant bit of the multiplicand, and adder means for adding two groups of block products to the output of the hold means, the two groups of block products consisting of alternate block products out of the k block products from the block product means.

6 Claims, 1 Drawing Figure

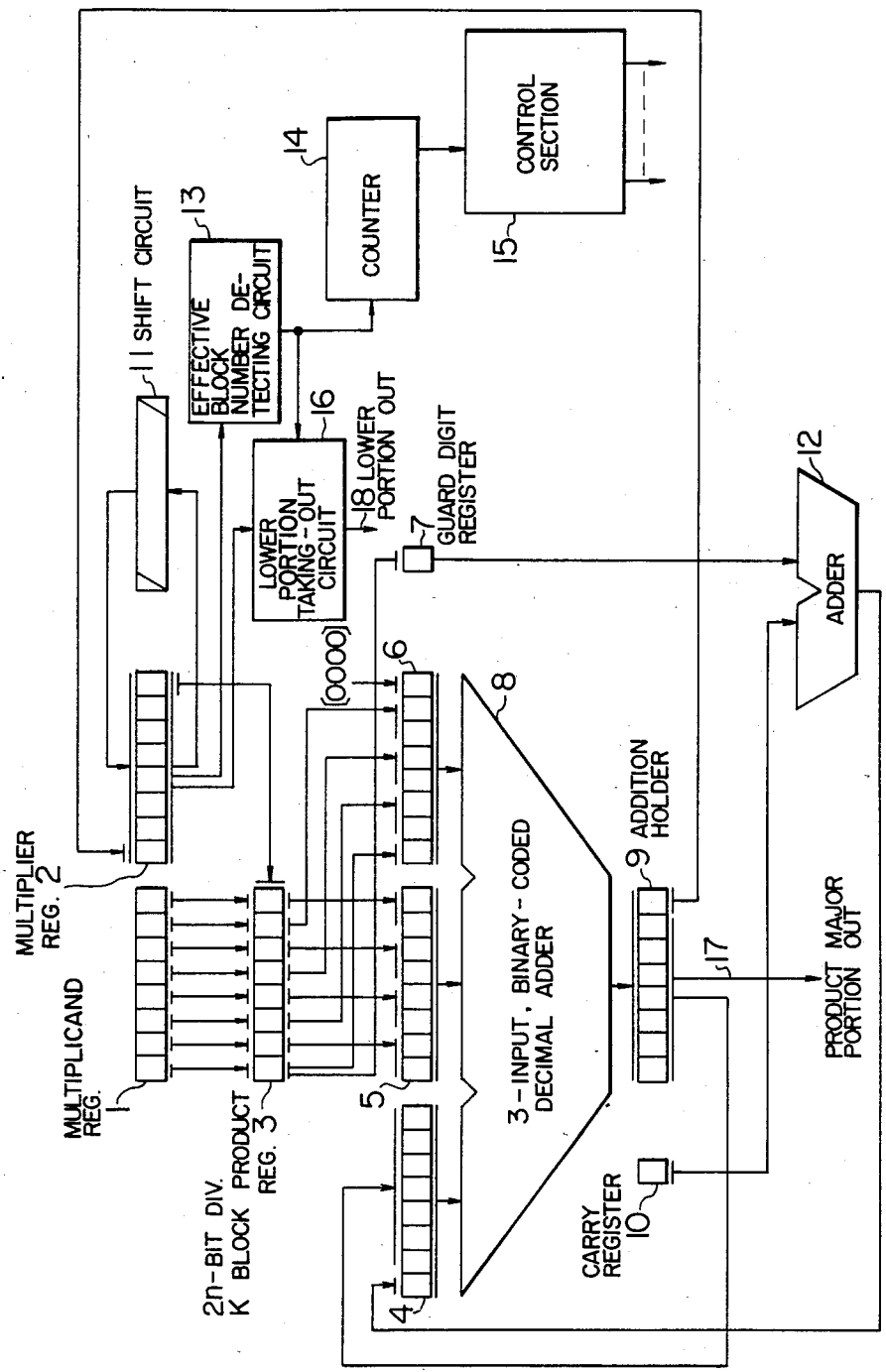

MULTIPLICATION DEVICE USING MULTIPLE-INPUT ADDER

BACKGROUND OF THE INVENTION

The present invention relates to a multiplier device for performing a multiplying operation at a high speed.

In a conventional multiplying system, multiples of a multiplicand are previously formed, and one of the multiples of the multiplicand corresponding to each digit of a mulitiplier is selected in each adding cycle to add the selected multiple to the result of accumulation obtained up to the preceding adding cycle.

In such a system, the number of multiples of a multiplicand which are added to each other is increased as the number of bits making up each digit of a multiplier is larger, and thus the multiplying operation is delayed due to increased stages for forming the multiples.

SUMMARY OF THE INVENTION

An object of the present invention, therefore, is to provide a multiplier device which overcomes the prior art problem and can perform a multiplying operation based upon a plural-bit scanning in the case where the number of bits making up each digit of a multiplier is two or more, at a high speed, without producing multiplies of a multiplicand at a special multiple production system.

In order to achieve the above object, according to the present invention, a multiplicand is divided at intervals of n bits from the least significant bit side into k blocks, where n is an integer equal to or greater than 2, each of the blocks is multiplied by the n bits of multiplier by a block-product forming means to obtain k block products each having 2n bits, alternate ones of the k block products are extracted to form two groups of block products, the two groups thus obtained are applied to two input terminals of a three-input adder, and the result of accumulation carried out up to the preceding adding cycle is applied to the remaining input terminal of the adder to add the applied block products and the result of accumulation to each other to perform a multiplying operation.

BRIEF DESCRIPTION OF THE DRAWINGS

Now, an embodiment of the present invention will be explained below in detail, with reference to the accompanying drawing.

The drawing is a block diagram of an embodiment of a multiplier device according to the present invention.

DESCRIPTION OF THE PREFERRED EMBODIMENT

The multiplication of binary-coded decimal numerals will be explained using the present embodiment. In the drawing, reference numeral 1 designates a four-byte register for holding a multiplicand, 2 a four-byte register for holding a multiplier, 3 a block-product forming circuit for multiplying each of eight blocks which are obtained by dividing the multiplicand register 1 at intervals of four bits from the least significant bit, by the least significant one of eight blocks which are obtained by dividing the multiplier register 2 in the above-mentioned manner, to obtain block products each having eight bits, and 8 a three-input, binary-coded decimal adder (hereinafter referred to as a "three-input adder") provided with four-byte input registers 4, 5 and 6 and a four-byte output register 9. Alternate ones of the eight block products formed by the block-product forming circuit 3 are taken out to form two groups of block products. One group including four block products which are odd-numbered ones from the least significant block product, is applied to the input register 5. The other group including four block products which are even-numbered ones from the least significant block product, is applied to an upper portion of the input register 6 other than four least significant bits. At this time, the four lower bits of the most significant block product are applied to four most significant bits of the input register 6, and the four upper bits of the most significant block product are applied to a guard digit register 7 for setting therein a guard digit in the course of arithmetic operation. Further, a value of 0000 is always supplied to the four least significant bits of the input register 6 to match the digit.

On the other hand, a lower portion of the input register 4 other than the four most significant bits thereof is connected to receive an upper portion of the output register 9 other than the four least significant bits thereof, and the four most significant bits of the input register 4 is supplied with the output of an adder 12 for adding the contents of the guard digit register 7 to the contents of a carry register 10 of the three-input adder 8. Four least significant bits of the output register 9 is applied to four most significant bits of the multiplier register 2.

Further, reference numeral 11 designates a shift circuit for shifting the contents of the multiplier register 2 to the right by four bits, and 13 an effective block number detecting circuit for detecting the number of effective blocks in the multiplier register 2 which hold a value other than zero. For example, in the effective block number detecting circuit 13, the blocks in the multiplier register 2 are decoded to find effective blocks, and it is detected whether the most significant effective block is first, second, . . . , or eighth effective block from the least significant effective block. Further, reference numeral 14 designates a counter for setting therein the output of the effective block number detecting circuit to decrease the contents of the counter 14 by one each time an adding cycle is carried out, and 15 a control section for controlling the whole of the present embodiment by a microprogram control system or others.

In the present embodiment, a lower portion of the result of multiplication is obtained in the multiplier register 2. A lower portion taking-out circuit 16 is used to take the above-mentioned lower portion out of the multiplier register 2. That is, the circuit 16 takes out blocks, the number of which is equal to a value obtained by subtracting one from the number of effective blocks detected by the effective block number detecting circuit 13, from an upper portion of the multiplier register 2. Alternatively, the lower portion of the result of multiplication is not applied to the multiplier register 2, but may be applied to a register for exclusive use or a register coupled unitarily with the lower-order side of the output register 9 to be shiftable therewith. However, such a circuit configuration becomes large in the number of registers as compared with the present embodiment.

The present embodiment operates of follows. Now, let us consider the case where numerals 5938 and 79 are set in the multiplicand register 1 and multiplier register 2, respectively, to perform a decimal multiplying operation 5938×79=469102.

At the beginning of the multiplying operation, it is detected by the effective block number detecting circuit 13 that the number of effective blocks in the multiplier (namely, the numeral 79) is equal to 2, and a value of 2 is set in the counter 14. The control section 15 delivers a control signal for starting an adding cycle since the contents of the counter 14 are larger than zero.

In the first adding cycle, the block values 0, 0, 0, 0, 5, 9, 3 and 8 of the multiplicand (namely, the numeral 5938) held in the multiplicand register 1 and the lower block value 9 of the multiplier (namely, the numeral 79) held in the multiplier register 2 are applied to the block-product forming circuit 3 to obtain block products 00, 00, 00, 00, 45, 81, 27 and 72 corresponding respectively to the block values 0. 0, 0, 0, 5, 9, 3 and 8 of the multiplicand.

Accordingly, the odd-numbered block products from the least significant block product, namely, values of 00, 00, 81 and 72 are applied to the input register 5, and thus the contents of the input register 5 become equal to 00008172. Further, the even-numbered block products from the least significant block product, namely, values of 0, 00, 45 27 are applied to the upper portion of the input register 6 other than the four least significant bits, and a value of 0 is applied to the four least significant bits to match the digit. Thus, the contents of the input register 6 become equal to 00045270. The guard digit register 7 is applied with the four upper bits of the most significant block product, namely, a value of 0.

A value of 00000000 is applied, as an initial value, to the input register 4. Accordingly, the contents of the output register 9 become equal to 00053442, and the contents of the carry register 10 are equal to zero.

In this state, the contents of the counter 14 become equal to 1. Accordingly, the control section 15 again delivers the control signal for starting an adding cycle. Thus, the contents of the multiplier register 2 are first shifted to the right by four bits, through the aid of the shift circuit 11, and then the four upper bits of the multiplier register 2 are supplied with the contents of the four least significant bits of the output register 9, namely, a value of 2. Thus, the contents of the multiplier register 2 become equal to 20000007. Next, the block values 0, 0, 0, 0, 5, 9, 3 and 8 of the multiplicand from the multiplicand register 1 and the upper block value 7 of the multiplier from the multiplier register 2 are applied to the block-product forming circuit 3 to obtain block products 00, 00, 00, 00, 35, 63, 21 and 56 corresponding respectively to the block values 0, 0, 0, 0, 5, 9, 3 and 8 of the multiplicand. The odd-numbered block products from the least significant block product, namely, values of 00, 00, 63 and 56 are applied to the input register 5, and thus the contents of the register 5 become 00006356. Further, the even-numbered block products from the least significant block product, namely, values of 0, 00, 35 and 21 are applied to the upper portion of the input register 6 other than the four least significant bits, and a value of 0 is applied to the four least significant bits to match the digit. Thus, the contents of the input register 6 become equal to 00035210. The guard digit register 7 is supplied with a value of 0. The lower portion of the input register 4 other than the four upper bits thereof is supplied with the upper portion of those contents of the output register 9 which indicate the result of addition having been carried out in the preceding adding cycle, other than the four lower bits, namely, a value of 0005344, and the four upper bits of the input register 4 are supplied with the summation of the contents of the carry register 10 (equal to zero) and the contents of the guard digit register 7 (equal to zero), that is, a value of 0. Thus, the contents of the input register 4 become 00005344. Accordingly, the contents of the output register are changed to 00046910, and the contents of the carry register 10 are still equal to 0.

In this state, the contents of the counter 14 become equal to zero. Accordingly, the control section 15 does not start an adding cycle any longer. The upper portion of the result (equal to 469102) of multiplication, namely, a value of 496910 is obtained in the output register 9, and sent to a different device (not shown) through a signal line 17. Further, the lower portion of the result of multiplication, namely, a value of 2 is obtained in the multiplier register 2, and sent to the different device through the lower portion taking-out circuit 16 and a signal line 18.

In the foregoing description, explanation has been made of the case where the multiplier has two effective blocks. When a multiplier includes three or more effective blocks, the number of adding cycles is increased. In this case, the number of lower blocks of the multiplication result which are to be taken out of the multiplier register 2, is also increased. Further, in the foregoing description an example has been explained where the multiplicand includes a relatively small number of blocks and a value of 0 is applied to the guard digit register 7. In the case where a multiplicand includes a large number of blocks and a value other than zero is applied to the guard digit register 7, the present embodiment performs the same operation as mentioned above, excepting that the value applied to the guard digit register 7 is added by the adder 12 to the contents of the carry register 10. Although the multiplication of binary-coded decimal numerals has been explained, it is needless to say that the multiplication of different kinds of numerals can be carried out in a similar manner.

In the present embodiment, each block-product forming part in the block-product forming circuit 3 is formed of a logical gate group including no carry bit. In more detail, since an 8-bit pattern corresponding to the product of a 4-bit block of a multiplicand and a 4-bit block of a multiplier is outputted to a single block-product forming part, each block-forming part can be formed of a simple logical gate group.

As has been explained in the foregoing, according to the present invention, it is not required to make multiples of a multiplicand at a special stage. That is, a time delay required for obtaining multiples of a multiplicand can be eliminated, and therefore a multiplying operation can be performed at a high speed.

What is claimed is:

1. A multiplier device comprising:
   (a) multiplicand register means for storing an input multiplicand;
   (b) multiplier register means for storing an input multiplier;
   (c) block product means connected to receive the outputs of said multiplicand register means and said multiplier register means for dividing the multiplicand from the multiplicand register means at intervals of n-bits from the least significant bit of the multiplicand into a plurality of n bit blocks, and for multiplying each of said plurality of n bit blocks by m bits of the multiplier from said multiplier register means to produce a plurality of block products each consisting of (n+m) bits, wherein n and m are integers equal to or greater than 2;

(d) block product grouping means connected to the output of said block product means for grouping said plurality of block products into a plurality of groups each consisting of respective alternate ones of said plurality of block products form said block product means;

(e) adding means including a multi-input binary-coded decimal adder connected to receive said plurality of groups of block products from the output of said block product grouping means at plural inputs thereof for adding said plurality of groups of block products to each other; and (f) addition hold means for temporarily retaining the result of the adding operation by said adding means to provide the result of multiplication, said adding means having one of said said multi-inputs connected to receive the output of said addition hold means to produce an accumulated addition result, thereby allowing addition of the accumulated addition result with the contents of said plural inputs.

2. A multiplier device comprising:

(a) multiplicand register means for storing an input multiplicand;

(b) multiplier register means for storing an input multiplier;

(c) multiplier readout means coupled with said multiplier register means for reading out said multiplier in successive groups of n-bits, beginning from the least significant bit of the multiplier, as the output of said multiplier register means, where n is an integer equal to or greater than 2;

(d) block product means connected to receive the content of said multiplicand register means and the successive groups of n-bits of said multiplier register means for dividing the multiplicand received from the multiplicand register means at intervals of n-bits from the least significant bit of the multiplicand into a plurality of bit blocks and for multiplying each of said plurality of bit blocks by each of the groups of n-bits of the multiplier successively received from said multiplier register means, to produce a plurality of block products each consisting of 2n bits each time a group of n-bits is read out from the multiplier register means;

(e) block product grouping means connected to the output of said block product means for grouping said plurality of block products into a plurality of block groups each consisting of alternate ones of said plurality of block products from said block product means each time said plurality of block products are outputted from said block product means;

(f) adding means including a binary-coded decimal having plural inputs connected to receive said plurality of block groups of block products from the output of said block product grouping means at its plural inputs for adding said block groups of block products to each other each time said plurality of block groups are received from said block product grouping means;

(g) addition hold means for temporarily retaining the result of the adding operation by said adding means, said adding means having an additional input connected to receive the output of said addition hold means to produce an accumulated addition result;

(h) control means for enabling the operations of said block product means, said block product grouping means, said adding means and said addition hold means while each group of n-bits is read out from said multiplier register means; and (i) output means for deriving the content of said addition hold means as a result of the multiplication when all of said groups of n-bits in the multiplier register means have been read out.

3. The multiplier device according to claim 2, wherein said multiplicand and said multiplier each are a binary-coded decimal numeral and n is 4.

4. The multiplier device according to claim 3, wherein said plurality of groups of block products comprise two groups and said adding means includes a three-input binary-coded decimal adder.

5. The multiplier device according to claim 2, said control means includes means for determining the number of adding operation cycles to be performed by said adding means based on the content of said multiplier register means and controls the operations of said block product means, said block product grouping means, said adding means and said addition hold means to execute the adding operation in the determined number of cycles.

6. The multiplier device according to claim 2, wherein a lower portion of the result of multiplication registered in said addition hold means is transferred into said multiplier register means from its most significant bit position and is derived together with an upper portion of the result of multiplication from said addition hold means in response to the control of said control means.

* * * * *